United States Patent
Nishida et al.

(10) Patent No.: US 10,146,331 B2
(45) Date of Patent: Dec. 4, 2018

(54) INFORMATION PROCESSING SYSTEM FOR TRANSFORMING COORDINATES OF A POSITION DESIGNATED BY A POINTER IN A VIRTUAL IMAGE TO WORLD COORDINATES, INFORMATION PROCESSING APPARATUS, AND METHOD OF TRANSFORMING COORDINATES

(71) Applicants: En Nishida, Tokyo (JP); Yuu Kodama, Kanagawa (JP)

(72) Inventors: En Nishida, Tokyo (JP); Yuu Kodama, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 390 days.

(21) Appl. No.: 14/941,767

(22) Filed: Nov. 16, 2015

(65) Prior Publication Data
US 2016/0154477 A1   Jun. 2, 2016

(30) Foreign Application Priority Data

Nov. 28, 2014 (JP) ................. 2014-241760
Dec. 24, 2014 (JP) ................. 2014-260634

(51) Int. Cl.
*G06F 3/0346* (2013.01)
(52) U.S. Cl.
CPC .................. *G06F 3/0346* (2013.01)
(58) Field of Classification Search
None
See application file for complete search history.

(56) References Cited

U.S. PATENT DOCUMENTS 5,757,360 A * 5/1998 Nitta ................. G06F 3/0346
345/156
6,198,485 B1 * 3/2001 MacK ................. G06F 3/013
345/156

(Continued)

FOREIGN PATENT DOCUMENTS

JP    2002-268807    9/2002
JP    2008-052366    3/2008

(Continued)

OTHER PUBLICATIONS

Zhengyou Zhang, a Flexible New Technique for Camera Calibration, Dec. 2, 1998.

*Primary Examiner* — David D Davis
(74) *Attorney, Agent, or Firm* — Harness, Dickey & Pierce, P.L.C.

(57) ABSTRACT

An information processing system includes a pointer to designate a position in a three-dimensional space relative to a display, and a first image capture device to capture the position designated by the pointer relative to the display as a virtual image of the pointer. In an example embodiment, a parameter calculator is included to calculate either a first or second parameter. The first parameter is used for transforming coordinates of the designated position in the virtual image to world coordinates, by touching the display. The second parameter is used for transforming coordinates of the designated position in the virtual image when the pointer is operated above the display, without touching the display. Finally, a world coordinate calculator is included to transform the coordinates of the position designated by the pointer in the virtual image to the world coordinates by applying the first parameter or the second parameter.

15 Claims, 11 Drawing Sheets

(56) References Cited

U.S. PATENT DOCUMENTS

| | | | | |
|---|---|---|---|---|
| 6,753,828 | B2 * | 6/2004 | Tuceryan | G02B 27/017 345/157 |
| 8,487,871 | B2 * | 7/2013 | Langridge | G06F 3/011 345/157 |
| 8,780,183 | B2 * | 7/2014 | Ito | G06T 19/006 348/43 |
| 2002/0105484 | A1 * | 8/2002 | Navab | G02B 27/017 345/8 |
| 2011/0205242 | A1 * | 8/2011 | Friesen | G06F 3/011 345/633 |
| 2014/0035847 | A1 | 2/2014 | Kodama et al. | |
| 2014/0192058 | A1 | 7/2014 | Kodama et al. | |
| 2015/0153846 | A1 | 6/2015 | Nishida | |

FOREIGN PATENT DOCUMENTS

| | | |
|---|---|---|
| JP | 2008-282283 | 11/2008 |
| WO | WO2005/106775 A1 | 11/2005 |

* cited by examiner

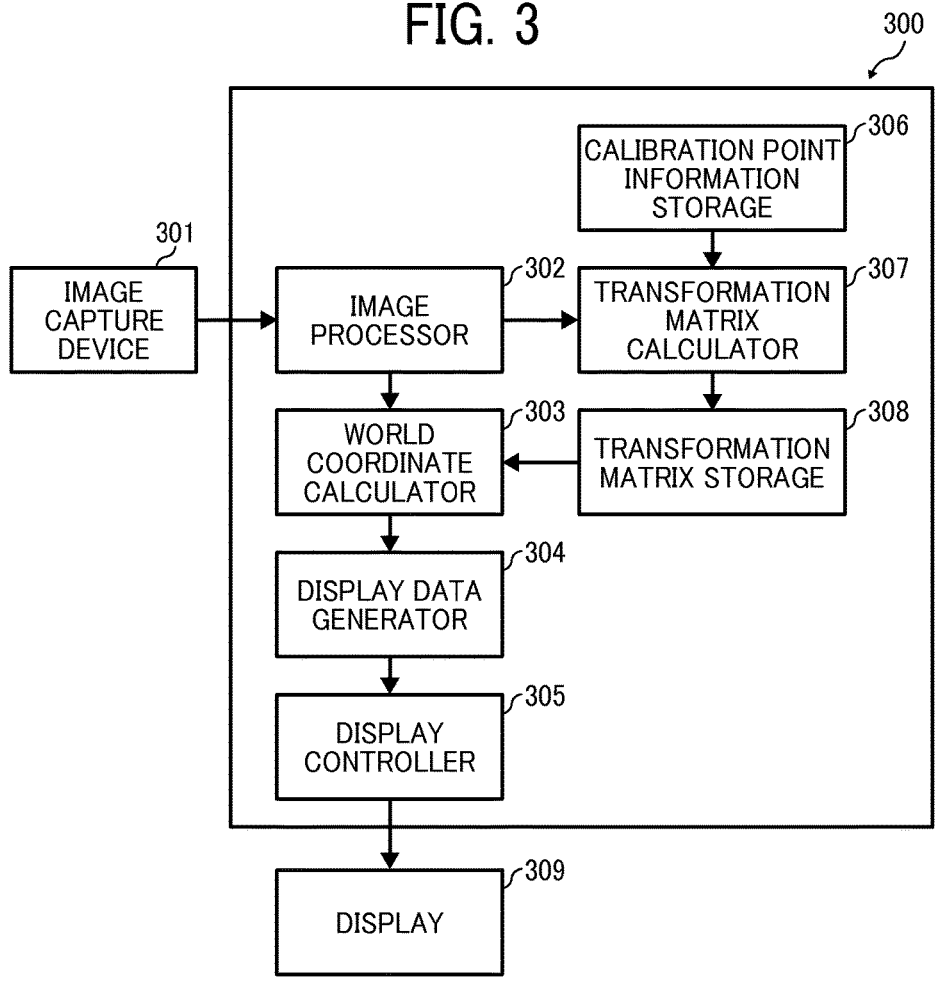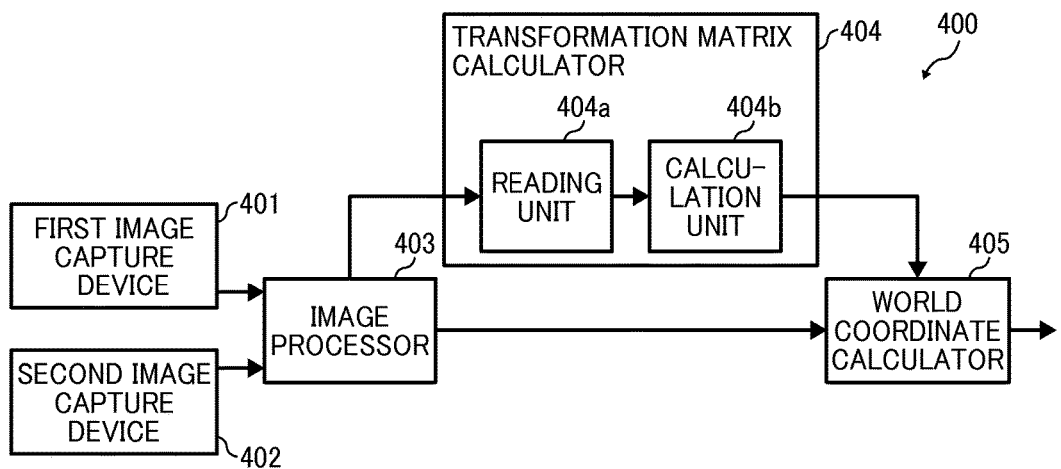

INFORMATION PROCESSING SYSTEM FOR TRANSFORMING COORDINATES OF A POSITION DESIGNATED BY A POINTER IN A VIRTUAL IMAGE TO WORLD COORDINATES, INFORMATION PROCESSING APPARATUS, AND METHOD OF TRANSFORMING COORDINATES

CROSS-REFERENCE TO RELATED APPLICATION

This application claims priority pursuant to 35 U.S.C. § 119 to Japanese Patent Application Nos. 2014-241760, filed on Nov. 28, 2014, and 2014-260634, filed on Dec. 24, 2014 in the Japan Patent Office, the disclosure of which is incorporated by reference herein in its entirety.

BACKGROUND

Technical Field

The present invention relates to an information processing system, an information processing apparatus, and a method of transforming coordinates.

Background Art

Conventionally, coordinate input systems are configured with a coordinate pointer (e.g., finger, pen), and a coordinate input face (e.g., flat display), in which the coordinate input face is touched by the coordinate pointer, and a trajectory of the coordinate pointer is displayed on the coordinate input face. In conventional coordinate input systems, it is required to pre-set a parameter (hereinafter, external variable) to be used for transforming coordinates of positions composing a virtual image captured by an image capture device such as a camera (hereinafter, coordinates of virtual image, virtual image coordinates) to coordinates of positions on a display face (hereinafter, world coordinates). Typically, the external variable can be set based on a combination of coordinates of virtual image and world coordinates, and can be defined as a transformation matrix that is used for optimizing a coordinate transformation of the virtual image coordinates to the world coordinates while reducing minimizing errors of points when the world coordinates is obtained from the virtual image coordinates.

Conventionally, the transformation matrix used for the coordinate transformation is determined and applied to points in a two-dimensional space defined by two orthogonal axes such as X-axis and Y-axis, in which each of the points has coordinates (x, y) but coordinate information of Z-axis is not included because of z=0 for the points in the two-dimensional space. Therefore, when a hovering mode (not-touching mode) is employed, position information of a pointer cannot be detected correctly. The hovering mode (hovering capability) means that a user operates the coordinate input system by placing the pointer (e.g., finger, pen) over the coordinate detection face without touching the coordinate detection face. For example, when a smartphone is used as the coordinate input system, positions can be designated without touching a screen by a finger or mouse, which means the finger or mouse hovers over the screen without touching the screen.

Conventionally, when world coordinates is determined, an indicator for optimizing a parameter and an indicator suitable for user may not match exactly. Specifically, when an error occurs to coordinates in the virtual image, a level of positional error that occurs on the world coordinates differs depending on positions. Therefore, even if the error of coordinates in the virtual image is reduced evenly, the positional error may occur greatly at some positions on the world coordinates.

Further, a user perceives deviation between coordinates of points touched by the user, and the calculated coordinates, wherein the deviation corresponds to the positional error on the world coordinate. The precision of world coordinates may vary whether the error in the virtual image is used as an indicator optimizing a parameter, or the positional error in the world coordinate is used as an indicator optimizing a parameter. Therefore, even if the error of coordinates in the virtual image is reduced evenly, the positional error may occur greatly at some positions on the world coordinates.

SUMMARY

In one embodiment of the present invention, an information processing system is devised. The information processing system includes a pointer to designate a position in a three-dimensional space relative to a display, and a first image capture device to capture the position designated by the pointer relative to the display as a virtual image of the pointer. A parameter calculator is included to calculate a first parameter used for transforming coordinates of the position designated by the pointer in the virtual image to world coordinates when the pointer is operated on the display by touching the display; or a second parameter used for transforming coordinates of the position designated by the pointer in the virtual image when the pointer is operated above the display without touching the display. Finally, a world coordinate calculator is included to transform the coordinates of the position designated by the pointer in the virtual image to the world coordinates by applying the first parameter or the second parameter calculated by the parameter calculator.

In another embodiment of the present invention, an information processing apparatus for transforming coordinates of a point of interest in a virtual image captured by a first image capture device to world coordinates in a two-dimensional space or a three-dimensional space is devised. The information processing apparatus includes an image processor to identify the coordinates of the point of interest in the virtual image as virtual image coordinates. A parameter calculator is included to calculate a first parameter used for transforming the coordinates of the position point of interest in the virtual image to world coordinates in the two dimensional space when the pointer is operated on the display by touching the display; or a second parameter used for transforming the coordinates of the position of the point of interest in the virtual image to world coordinates in the three dimensional space when the pointer is operated above the display without touching the display. A, a world coordinate calculator is included to transform the coordinates of the position of the pointer in the virtual image to the world coordinates by applying the first parameter or the second parameter calculated by the parameter calculator, a display data generator to generate display data based on the calculated world coordinates. Finally, a display controller is included to display the generated display data on the display.

In yet another embodiment of the present invention, a method of transforming coordinates of a point of interest composing a virtual image captured by a first image capture device to world coordinates in a two dimensional space or a three dimensional space is devised. The method includes identifying coordinates of the point of interest composing the virtual image captured by the first image capture device as coordinates of the virtual image; and calculating a first parameter used for transforming the coordinates of the point of interest in the virtual image to world coordinates in the two-dimensional space when the point of interest exists on a display; or a second parameter used for transforming the coordinates of the point of interest in the virtual image to world coordinates in the three-dimensional space when the point of interest exists above the display. The method further includes transforming the coordinates of the point of interest in the virtual image to the world coordinates by applying the first parameter or the second parameter. Finally, the method includes generating display data from the calculated world coordinates, and displaying the generated display data on the display.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 3 is a functional block diagram of the information processing apparatus devised as the controller of FIG. 1;

FIG. 4 is a schematic configuration of a transformation matrix calculator of one or more example embodiments of the present invention;

Figure 1:
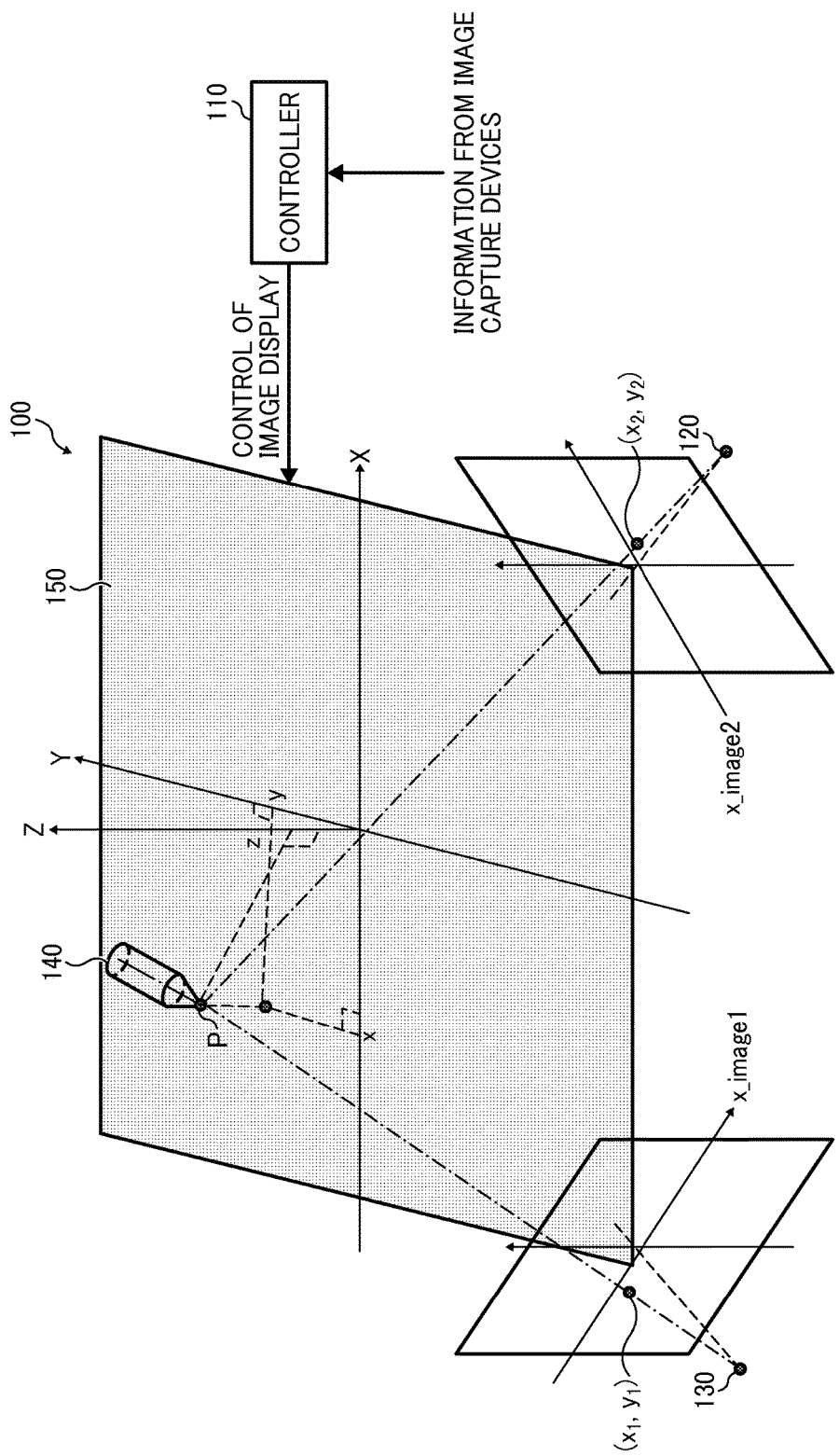
FIG. 1 is a schematic configuration of an information processing system according to one or more example embodiments of the present invention.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, an apparatus or system according to one or more example embodiments is described hereinafter.

(Configuration of System)

FIG. 1 is a schematic configuration of an information processing system 100 according to one or more example embodiments of the present invention. The information processing system 100 includes, for example, a controller 110, a display apparatus 150, and a plurality of image capture devices 120 and 130 such as cameras used for capturing an image of an object such as a pointer (e.g., finger, pen). The controller 110 can be devised as an information processing apparatus 200 (see FIG. 2) of one or more example embodiments of the present invention. The controller 110 analyzes a movement of the pointer such as a pointing device 140 on or over the display apparatus 150 by receiving image information from the image capture devices 120 and 130 when the pointing device 140 is moved by a user operation, generates an image corresponding to the user operation, and performs a displaying control to display the image on the display apparatus 150. The display apparatus 150 may be simply referred to the display in this description.

When a user operation is performed on the display apparatus 150 by touching the pointing device 140 on the display apparatus 150 or a user operation is performed above the display apparatus 150 without touching the pointing device 140 to the display apparatus 150, each of the image capture devices 120 and 130 detects the user operation performed at one or more positions of the display apparatus 150 by touching the pointing device 140 on the display apparatus 150 or without touching the pointing device 140 to the display apparatus 150, and acquires coordinates P (x, y, z) of the one or more positions on or over the display apparatus 150 touched or not-touched by the pointing device 140 as "world coordinates (or global coordinates)" from information of virtual images captured by the image capture devices 120 and 130. In this description, an image captured by the image capture device is referred to the virtual image for the simplicity of expression.

As to the one or more example embodiments of the present invention, an image drawn by the user operation can be generated and then displayed on the display apparatus 150 when the user performs the user operation on or above the display apparatus 150 by touching or not-touching by the pointing device 140 to the display apparatus 150. Hereinafter, an input mode that inputs a movement of the pointing device 140 relative to the display apparatus 150 without touching the display apparatus 150 is referred to a "hovering input" or "hovering mode." As to a configuration of FIG. 1, coordinates of positions in the virtual images captured by the image capture devices 130 and 120 are respectively defined (x1, y1) for the image capture device 130, and (x2, y2) for the image capture device 120.

Figure 2:
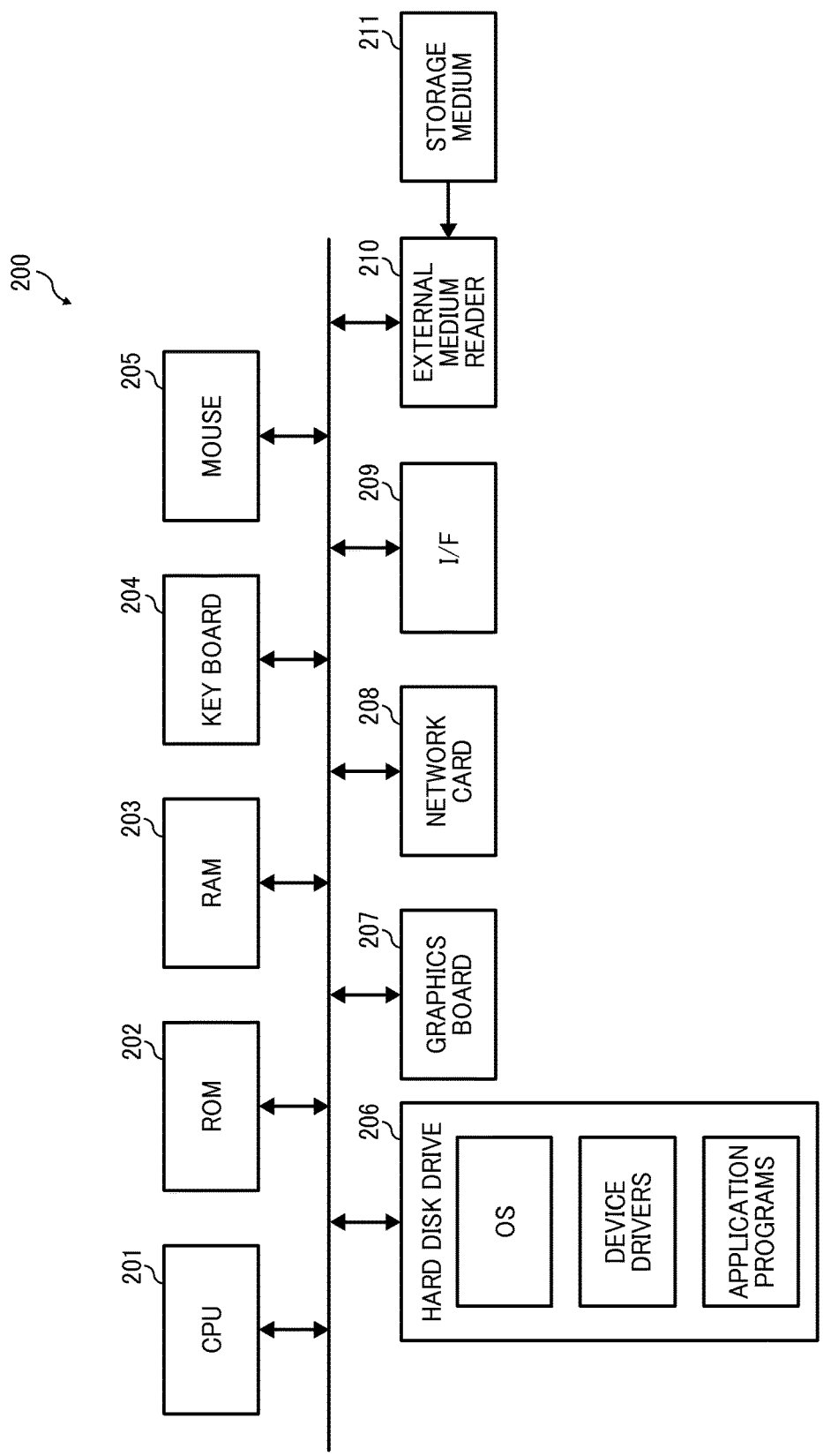
FIG. 2 is a hardware configuration of an information processing apparatus devised as a controller of FIG. 1.

FIG. 2 is a hardware configuration of an information processing apparatus 200 that can be devised as the controller 110 of FIG. 1. The information processing apparatus 200 includes, for example, a central processing unit (CPU) 201, a read only memory (ROM) 202, a random access memory (RAM) 203, a key board 204, and a mouse 205, and these hardware components can be coupled or connected with each other by a bus such as a system bus and bus bridge. The CPU 201 reads out programs stored in the RAM 203 and executes the programs to implement various functions of the controller 110. The ROM 202 stores basic input output system (BIOS) for providing the input and output function of the information processing apparatus 200, and provides power-on self test (POST) function to enable the inputting and outputting with the CPU 201.

Further, the ROM 202 can employ a rewritable ROM such as electrically erasable and programmable read only memory (EEPROM) or the like. The rewritable ROM can store discrete data and user data used by the information processing apparatus 200. The key board 204 and the mouse 205 can be used to input and output information for the information processing apparatus 200, and the key board 204 and the mouse 205 can be connected with the information processing apparatus 200 by universal serial bus (USB) system using peripheral component interconnect (PCI) bus bridge.

The information processing apparatus 200 further includes a hard disk drive 206, a graphics board 207, and a network card 208. The hard disk drive 206 stores operating system (OS), various device drivers, and various application programs. Upon activated, the CPU 201 accesses the hard disk drive 206 to read the OS, device drivers and various application programs, and set the OS, device drivers and various application programs to the RAM 203 to perform various processing. The graphics board 207 is a processor that performs an outputting to the display apparatus 150, and preferably includes a graphics processor or circuit. The network card 208 provides functions of the first layer to the second layer of open systems interconnection (OSI) reference model to connect the information processing apparatus 200 to various networks such as the Internet and local area network (LAN). The information processing apparatus 200 includes an interface (I/F) 209 that enables the input and output with various external devices. The information processing apparatus 200 further includes an external medium reader 210 that can communicate with a storage medium 211 such as CD-ROM, MO or the like.

FIG. 3 is a functional block diagram 300 of the information processing apparatus 200, which can be devised as the controller 110 of FIG. 1. The information processing apparatus 200 implements each of functional blocks shown in FIG. 3 by executing programs by using the CPU 201. The functional block diagram 300 of the information processing apparatus 200 includes, for example, an image processor 302, a calibration point information storage 306, and a transformation matrix calculator 307.

The image processor 302 acquires image information from an image capture device 301. The image capture device 301 corresponds to the image capture devices 130 and 120 (FIG. 1), and image capture devices 401 and 402 (FIG. 4) in this description. The image processor 302 analyzes features of an image drawn by the pointing device 140 and captured by using the image capture device 301.

The calibration point information storage 306 stores world coordinates of a calibration point set on an effective display area of the display apparatus 150. The calibration point can be used to calibrate relative positions of the image capture device 301 and the display apparatus 150.

The transformation matrix calculator 307 calculates a transformation matrix for transforming or converting coordinates between two coordinate systems based on information of world coordinates of the calibration point and information of a virtual image captured for a calibration point acquired by the image processor 302. Specifically, based on the calculated transformation matrix, transformation or conversion of coordinates can be performed between two coordinate systems such as a coordinate system for a "virtual image capturing plane" captured by the image capture device 301 and another coordinate system set for an "effective display area" on the display apparatus 150 used as world coordinates. The transformation matrix calculator 307 stores the generated transformation matrix in a storage such as a transformation matrix storage 308. The transformation matrix calculator 307 can be used a parameter calculator that calculates a parameter such as a matrix.

As illustrated in FIG. 3, the information processing apparatus 200 further includes a world coordinate calculator 303, a display data generator 304, and a display controller 305. The world coordinate calculator 303 calculates world coordinates of points of interest in virtual image information based on an image analysis result by the image processor 302, and the transformation matrix. The display data generator 304 generates data to be displayed on the display apparatus 150 from the world coordinates generated for the points of interest, and transmits the data such as video data to the display controller 305. The display controller 305 instructs a display device 309 to display the data transmitted from the display data generator 304. The display device 309 disposed for the display apparatus 150 is, for example, a liquid crystal display (LCD) panel disposed for the display apparatus 150.

With employing the above described configuration, an image can be displayed on the display apparatus 150 based on the image analysis by the image processor 302, in which the image is drawn by touching or not-touching the pointing device 140 to the display apparatus 150 by a user. Therefore, as to one or more example embodiments, both of a touching condition and an un-touching condition (hovering condition) can be detected, and an imaging control can be performed for both of the touching condition and the un-touching condition.

FIG. 4 is a schematic configuration of the transformation matrix calculator 307 of the one or more example embodiments of the present invention. In an example configuration of FIG. 4, two image capture devices such as first and second image capture devices 401 and 402 are used. Upon capturing information of virtual images by using the first and second image capture devices 401 and 402, each of the first and second image capture devices 401 and 402 respectively transmits the virtual image information to the image processor 403. The image capture devices 401 and 402 are also referred as the image capture devices 120, 130, or 301 in this description. Upon receiving the virtual image information from the first and second image capture devices 401 and 402, the image processor 403 transmits the received virtual image information to a transformation matrix calculator 404.

The transformation matrix calculator 404 includes, for example, a reading unit 404a, and a calculation unit 404b. The transformation matrix calculator 404 calculates a transformation matrix for each of the first and second image capture devices 401 and 402 based on the image data received from each of the first and second image capture devices 401 and 402, which can minimize a positional error in the world coordinate system. A world coordinate calculator 405 calculates world coordinates by applying the calculated transformation matrix, and instructs the display device 309 of the display apparatus 150 to display an image at positions corresponding to the calculated world coordinates.

(Calculation of Transformation Matrix and World Coordinates)

Figure 5:
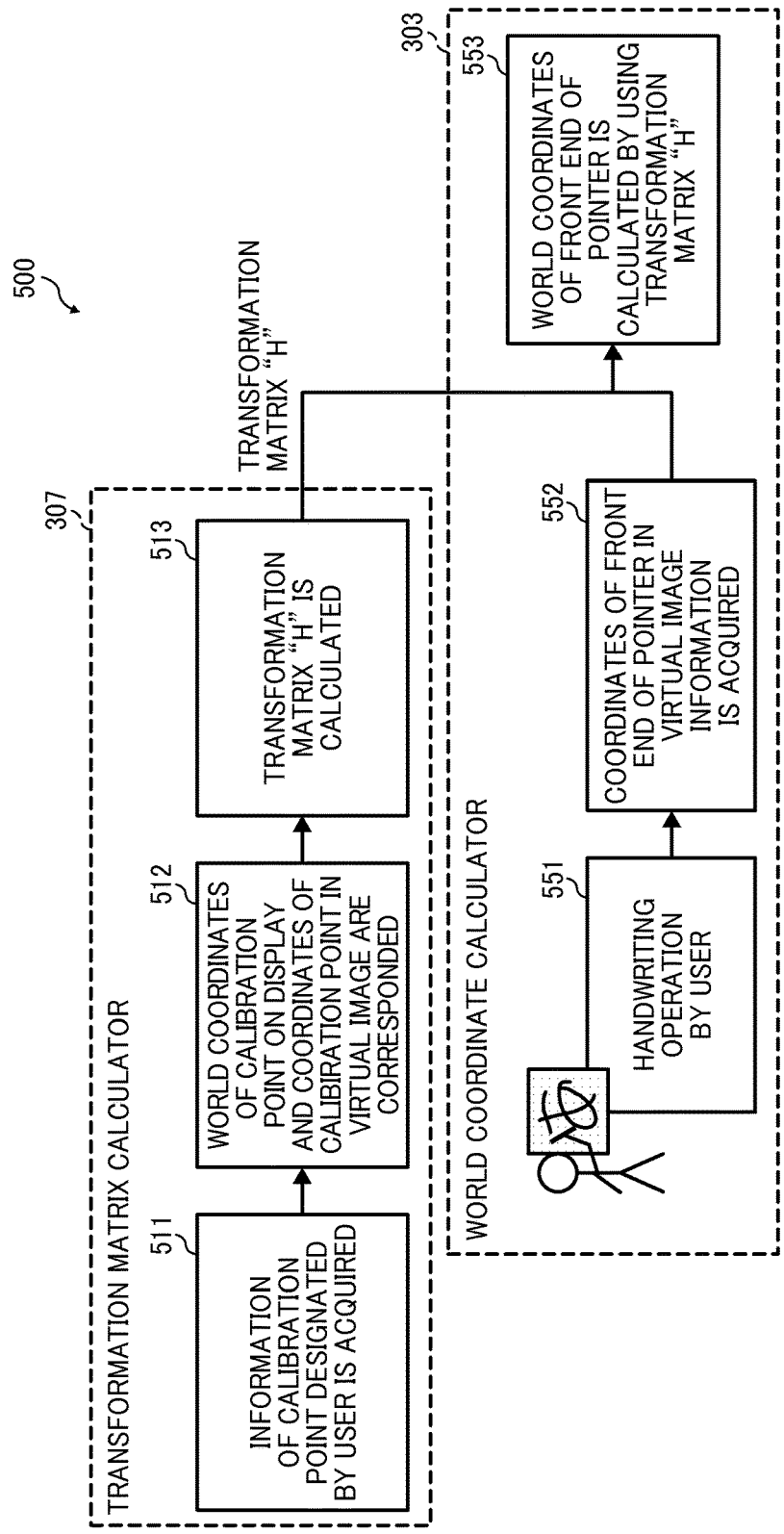
FIG. 5 is a first scheme of flow of data processable by the transformation matrix calculator and a world coordinate calculator.

A description is given of calculation or generation of a transformation matrix and world coordinates of one or more example embodiments of the present invention. FIG. 5 is a first scheme 500 of flow of data processable by the transformation matrix calculator 307 and the world coordinate calculator 303 when positions are designated by using the contact method. Specifically, the transformation matrix calculator 307 acquires information of virtual image at a calibration point designated by a user (box 511). The virtual image information is analyzed to correspond coordinates of the virtual image captured by the image capture device to world coordinates of the designated calibration point (box 512). This corresponding process of the virtual image plane of the image capture device and the display apparatus 150 can be performed by using a rotation matrix of Cartesian coordinate system and a translation vector for the center of each of the virtual image.

Based on this corresponding process, a transformation matrix "H" is calculated (box 513). The calculation of transformation matrix "H" will be described later in detail. The calculated transformation matrix "H" is stored in a storage with known data format.

Further, the world coordinate calculator 303 acquires information of a virtual image drawn by a handwriting operation by a user (box 551). Then, the world coordinate calculator 303 acquires coordinates of the front end of the pointing device 140 in the virtual image information (box 552). Then, the world coordinate calculator 303 transforms the coordinates of the virtual image information to the world coordinates (box 553), with which the virtual image drawn by the handwriting operation by the user can be displayed on the display apparatus 150.

The example case of FIG. 5 is performed based on an assumption that the front end of the pointing device 140 is on a surface of the display apparatus 150 (i.e., the pointing device 140 is contacting the display apparatus 150), which means the coordinates of the point of interest in a direction perpendicular to the display face of the display apparatus 150 (e.g., coordinates in the direction of Z-axis) is assumed "zero (0)." Therefore, FIG. 5 is a case that the user contacts the pointing device 140 on the display device such as a display panel of the display apparatus 150.

A description is given of an algorism for calculating world coordinates. Hereinafter, the world coordinates of the calibration point is referred as $(X_{world}, Y_{world}, Z_{world})$, and coordinates of the calibration point on a virtual image plane captured by the image capture device is referred as "virtual image coordinates" such as $(X_{image}, Y_{image})$.

The world coordinates and the virtual image coordinates can be correlated by the below formula (1), in which a rotation matrix of coordinate systems, and a translation vector corresponding to the deviation of the center of coordinate system are used.

$$\lambda_1 \cdot \begin{bmatrix} x_{image} \\ y_{image} \\ 1 \end{bmatrix} = \begin{bmatrix} r_{11} & r_{12} & r_{13} & t_{14} \\ r_{21} & r_{22} & r_{23} & t_{24} \\ r_{31} & r_{32} & r_{33} & t_{34} \end{bmatrix} \begin{bmatrix} X_{world} \\ Y_{world} \\ Z_{world} \\ 1 \end{bmatrix} \quad (1)$$

As to the formula (1), "$\lambda$" represents a proportionality constant that corresponds a difference of size between the world coordinates and virtual image coordinates, "$r_{ij}$" represents elements of the rotation matrix, and "$t_{lm}$" represents elements of the translation vector. In this case, a matrix "P" for simultaneously transforming the rotation and translation is defined by the below formula (2).

$$P = \begin{bmatrix} r_{11} & r_{12} & r_{13} & t_{14} \\ r_{21} & r_{22} & r_{23} & t_{24} \\ r_{31} & r_{32} & r_{33} & t_{34} \end{bmatrix} = [r_1 \ r_2 \ r_3 \ t] \quad (2)$$

As to the formula (2), "$r_i$" represents a column vector of rotation vector related to the rotation angle about the axis "i" representing X, Y, and Z axes (i=X, Y, Z), and "t" represents a translation vector between the coordinate systems.

(Configuration for Designating Touched Position)

Hereinafter, an example case that a user contacts or touches the display face of the display apparatus 150 used as a position display apparatus to instruct or designate positions is described. When the user contacts the pointing device 140 onto the display face of the display apparatus 150 to instruct or designate positions, the coordinates of "Zworld" can be assumed "0" because the pointing device 140 contacts the display face of the display apparatus 150. Therefore, the element information of "Zworld" can be omitted from the formula (1), and thereby the above matrix "P" can be changed to a matrix "H" such as "3×3" matrix as indicated by the below formula (3).

$$\lambda_3 \cdot \begin{bmatrix} x_{image} \\ y_{image} \\ 1 \end{bmatrix} = \begin{bmatrix} H_{11} & H_{12} & H_{13} \\ H_{21} & H_{22} & H_{23} \\ H_{31} & H_{32} & H_{33} \end{bmatrix} \begin{bmatrix} X_{world} \\ Y_{world} \\ 1 \end{bmatrix} \quad (3)$$

As to the formula (3), suffixes "1, 2 and 3" are respectively assigned to the X, Y, and Z axes. The matrix "H" can be expressed by column vectors "hi" as indicated by the below formula (4).

$$H = \begin{bmatrix} H_{11} & H_{12} & H_{13} \\ H_{21} & H_{22} & H_{23} \\ H_{31} & H_{32} & H_{33} \end{bmatrix} = [h_1 \ h_2 \ h_3] \quad (4)$$

Then, elements are calculated for the formula (3), $\lambda$ is erased, and the formula (3) is changed into a format of multiplication of column and row vectors of nine dimensions, the below formula (5) is obtained.

$$\begin{bmatrix} X_{world} & Y_{world} & 1 & 0 & 0 & 0 & -X_{world} \cdot x_{image} & -Y_{world} \cdot x_{image} & -x_{image} \\ 0 & 0 & 0 & X_{world} & Y_{world} & 1 & -X_{world} \cdot y_{image} & -Y_{world} \cdot y_{image} & -y_{image} \end{bmatrix} \begin{bmatrix} H_{11} \\ \ldots \\ H_{33} \end{bmatrix} = 0 \quad (5)$$

Since it is assumed that "Zworld=0," "$H_{33}$" is set to a constant of "1." In this case, the number of undetermined variables becomes eight (8), in which the formula (5) can be solved by obtaining information of at least four calibration points. If the information of four or more points can be used, elements of the transformation matrix can be obtained by performing the fitting of "$H_{11}$" to "$H_{33}$" by using the least squares method.

The calculation of world coordinates can be performed as follows. When the elements of X-axis and Y-axis in the formula (3) are calculated, a matrix having columns and rows can be expressed by setting "Xworld" and "Yworld" as variables as indicated by the below formula (6).

$$\begin{bmatrix} x_{image} \cdot H_{31} - H_{11} & x_{image} \cdot H_{32} - H_{12} \\ y_{image} \cdot H_{31} - H_{21} & y_{image} \cdot H_{32} - H_{22} \end{bmatrix} \begin{bmatrix} X_{world} \\ Y_{world} \end{bmatrix} = \begin{bmatrix} H_{13} - x_{image} \cdot H_{33} \\ H_{23} - y_{image} \cdot H_{33} \end{bmatrix} \quad (6)$$

When an inverse matrix is multiplied to the left side of the formula (6) to solve "Xworld" and "Yworld," the below formula (7) is obtained.

$$\begin{bmatrix} X_{world} \\ Y_{world} \end{bmatrix} = \begin{bmatrix} x_{image} \cdot H_{31} - H_{11} & x_{image} \cdot H_{32} - H_{12} \\ y_{image} \cdot H_{31} - H_{21} & y_{image} \cdot H_{32} - H_{22} \end{bmatrix}^{-1} \cdot \begin{bmatrix} H_{13} - x_{image} \cdot H_{33} \\ H_{23} - y_{image} \cdot H_{33} \end{bmatrix} \quad (7)$$

As to the formula (7), since "Ximage" and "Yimage" can be analyzed by the image processor 302, the world coordinates (Xworld, Yworld, 0) can be obtained. Further, by using the two image capture devices, the triangulation analysis method can be employed, with which the world coordinates can be acquired correctly.

As to the above described processing, the world coordinates are calculated by omitting or excluding information of coordinates of "Zworld". Therefore, the above described processing can be applied when the user contacts or touches the pointer on the display device of the display apparatus 150.

(Configuration for Designating the Non-Contact Position Method or Hovering Mode)

The process described in the above configuration for designating the touched position can be applied to a system of designating the touched position that assumes "Zworld" is zero as a priori condition, but cannot be applied to the hovering method or mode because information of "Zworld" is not included. Therefore, another processing is required for the hovering method or mode. Hereinafter, a description is given of designation of position by the hovering method. As to the hovering method, the matrix "P" represented by the formula (2) can be re-calculated. However, since the transformation matrix "H" is already calculated, the recognition of designated position can be performed for the hovering method by using the calculated transformation matrix "H" without re-calculating the matrix "P." In this case, the rotation of coordinate systems is calibrated by using the calculated transformation matrix "H", and then "Zworld" is determined from the virtual image information by applying geometrical optics relationship.

This process can be performed by calculating the elements of the matrix "P" from the transformation matrix "H," in which the elements of the matrix "P" can be calculated by using the calculated transformation matrix "H" represented by the below formula (8).

$$[h_1 h_2 h_3] = (\lambda_3/\lambda_1) A [r_1 r_2 t] \quad (8)$$

In the formula (8), a matrix A is an internal parameter of the image capture device, which is defined by the below formula (9).

$$A = \begin{bmatrix} f_x & 0 & c_x \\ 0 & f_y & c_y \\ 0 & 0 & 0 \end{bmatrix} \quad (9)$$

Further, "$\lambda 1$ and $\lambda 3$" in the formula (8) can be respectively deduced from the formula (1) and the formula (3) as indicated by the below formula (10).

$$\lambda_1 = r_{31} \cdot X_{world} + r_{32} \cdot Y_{world} + r_{33} \cdot Z_{world} + t_{34}$$

$$\lambda_3 = H_{31} \cdot X_{world} + H_{32} \cdot Y_{world} + H_{33} \quad (10)$$

As to the formula (9), (cx, cy) indicates the center of virtual image, and (fx, fy) is the focal distance expressed by the unit of pixels. The matrix A, used as the internal parameter, can be determined by known methods such as a method described in "A Flexible New Technique for Camera Calibration, Zhengyou Zhang. Dec. 2, 1998" or others. The matrix A (internal parameter) of the image capture device, which is unique to each of the image capture devices, can be measured in advance, and stored in a memory.

As to [h1 h2 h3] and [r1 r2 r3 t] of the formula (8), r3 has an orthogonal relationship with r1 and r2. Therefore, "r3=r1×r2" can be obtained as a cross product of vectors. By multiplying the inverse matrix $A^{-1}$ from the left side of the formula (8) by using this orthogonal relationship, the following relationships can be obtained, with which the matrix "P" can be calculated from the transformation matrix "H."

$$r_1 = \lambda A^{-1} h_1$$

$$r_2 = \lambda A^{-1} h_2$$

$$r_3 = r_1 \times r_2$$

$$t = \lambda A^{-1} h_3 \tag{11}$$

As to the formula (11), "λ" is normalization constant obtained from the below formula (12).

$$\lambda = 1/\|A^{-1} h_1\| \tag{12}$$

Then, the calculated matrix "P" is stored in a storage as a calibration parameter to be used for recognizing the position designated by the hovering method.

Figure 6:
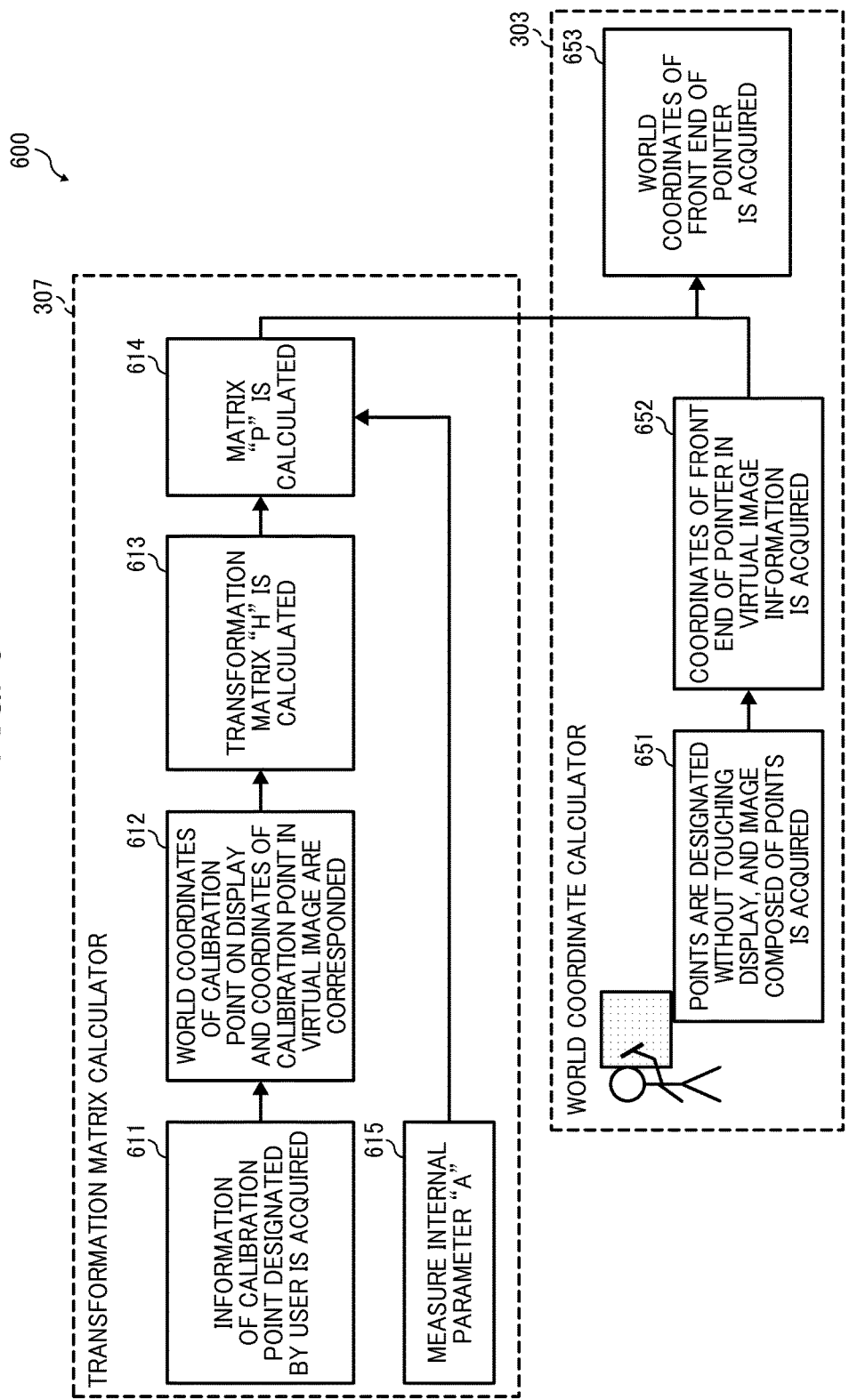
FIG. 6 is a second scheme of flow of data processable by the transformation matrix calculator and the world coordinate calculator when positions are designated by applying a non-contact method (hovering mode).

FIG. 6 is a second scheme 600 of flow of data processable by the transformation matrix calculator 307 and the world coordinate calculator 303 when positions are designated by using the non-contact method (hovering mode). The transformation matrix calculator 307 acquires information of a virtual image at a calibration point designated by a user (box 611). Then, the transformation matrix calculator 307 corresponds the coordinates of the virtual image and the world coordinates at the calibration point (box 621). The transformation matrix calculator 307 calculates a transformation matrix "H" (box 613) similar to the scheme of FIG. 5. The calculated transformation matrix "H" can be used to calculate the matrix "P" (box 614).

Further, the transformation matrix calculator 307 measures the matrix "A," which is the internal parameter in the formula (9), and stores the matrix "A" in a storage (box 615). Upon completing the calculation of transformation matrix "H" (box 613) and measuring the matrix "A" (box 615), the matrix "P" is calculated from the transformation matrix "H" and the matrix "A" (box 614). Further, the world coordinate calculator 303 acquires an image designated by a user using the hovering mode (box 651), and acquires coordinates of the front end of the pointing device 140 in the virtual image information (box 652). When the non-contact position designation method is used, world coordinates designated by the user without touching the display device can be acquired by using the matrix "P" as a transformation matrix (box 653), in which the transformation matrix "H" is not used.

As to the above described configuration, coordinates of positions on the display apparatus 150 designated by the user by using the contact position designation method and the non-contact position designation method can be determined without changing the hardware configuration of the system.

Figure 7:
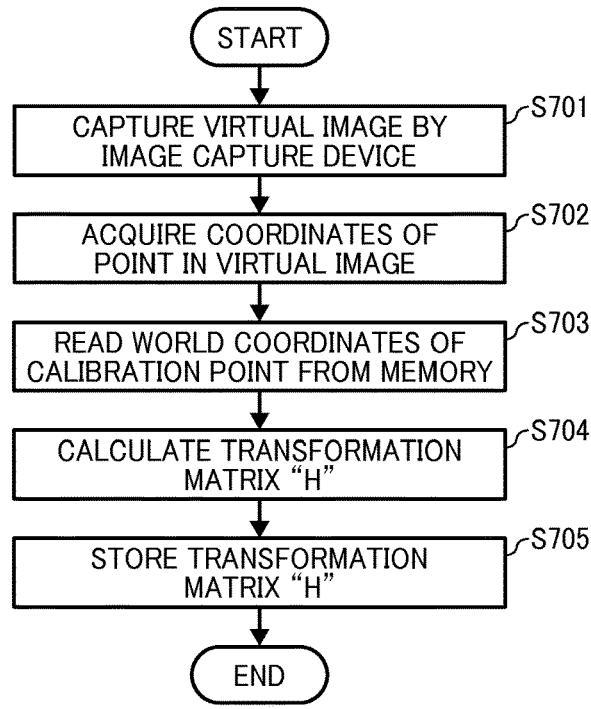
FIG. 7 is a flow chart showing the steps of calculating a transformation matrix "H."

FIG. 7 is a flow chart showing the steps of calculating the transformation matrix "H." At step S701, a virtual image including a calibration point designated by a user is captured by the image capture device. At step S702, coordinates of the designated calibration point in the captured virtual image is acquired. Then, at step S703, world coordinates of the calibration point stored in a storage in advance is read out. At step S704, the transformation matrix "H" is calculated. At step S705, the elements of the calculated transformation matrix "H" are stored in a storage with a given format, and then the sequence ends.

Figure 8:
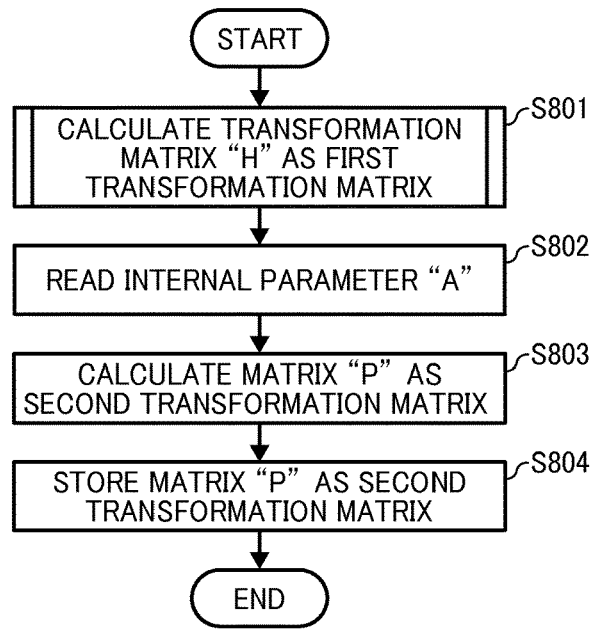
FIG. 8 is a flow chart showing the steps of calculating a matrix "P" as a second transformation matrix from a calculated transformation matrix "H" for performing a position designation by the non-contact method.

FIG. 8 is a flow chart showing the steps of calculating the matrix "P" as a second transformation matrix from the calculated transformation matrix "H" for recognizing the position designated by the non-contact method. At step S801, the transformation matrix "H" (used as a first transformation matrix) is calculated by performing the sequence of FIG. 7. At step S802, the measured internal parameter such as the matrix "A" is read out. At step S803, a second transformation matrix "P" is calculated based on the transformation matrix "H" and the matrix "A." Then, the second transformation matrix "P" is stored in a storage with a given format, and then the sequence ends.

Figure 9:
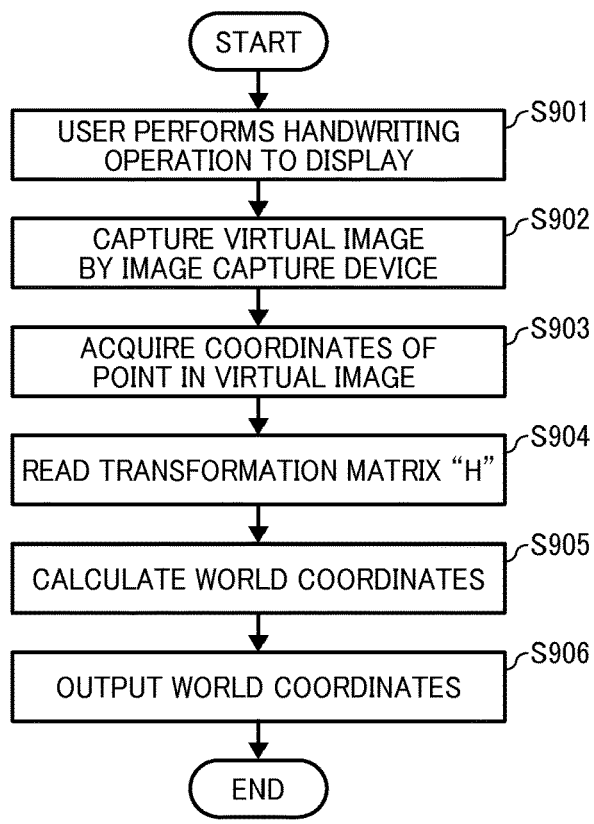
FIG. 9 is a flow chart showing the steps of calculating world coordinates on a display apparatus when a contact position designation method is used.

FIG. 9 is a flow chart showing the steps of calculating world coordinates on the display apparatus 150 when the contact position designation method is used. At step S901, a user performs a handwriting operation such as a drawing action to the display apparatus 150. At step S902, the image capture device 301 captures a virtual image corresponding to the handwriting operation performed by the user. Then, at step S903, coordinates of designated points in the virtual image is acquired.

At step S904, the transformation matrix "H" is read out. At step S905, world coordinates (Xworld, Yworld) is calculated by using the formula (7). At step S906, the calculated world coordinates (Xworld, Yworld) is output. Then, an image corresponding to the handwriting operation performed by the user is displayed on the display apparatus 150, and the sequence ends.

Figure 10:
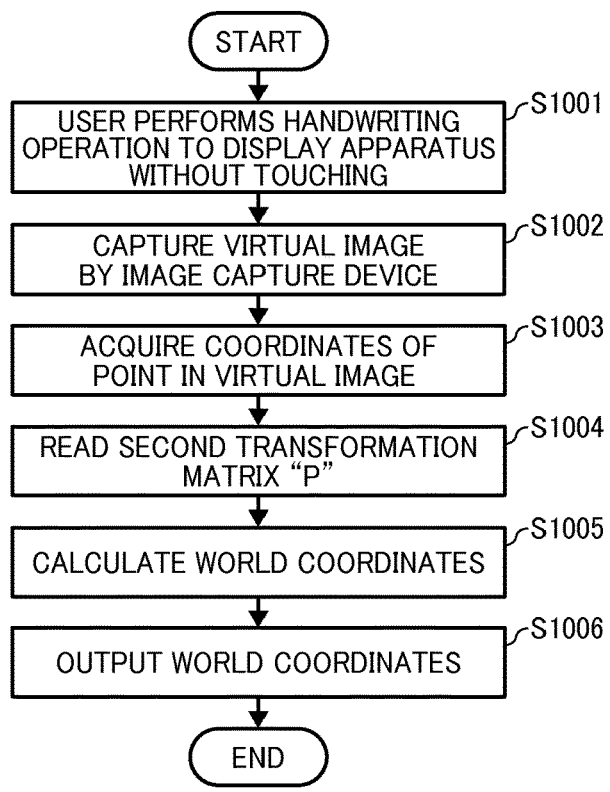
FIG. 10 is a flow chart showing the steps of calculating world coordinates when a non-contact position designation method is used.

Further, FIG. 10 is a flow chart showing the steps of calculating world coordinates when the non-contact position designation method is used. At step S1001, a user performs a handwriting operation such as a drawing action to the display apparatus 150. At step S1002, the image capture device 301 captures a virtual image corresponding to the handwriting operation performed by the user. Then, at step S1003, coordinates of designated points in the virtual image is acquired.

At step S1004, the second transformation matrix "P" is read out. At step S1005, world coordinates (Xworld, Yworld, Zworld) is calculated based on the formula (7). At step S1006, the calculated world coordinates (Xworld, Yworld, Zworld) is output. Then, an image corresponding to the handwriting operation performed by the user is displayed on the display apparatus 150, and the sequence ends.

By employing the above described processing, the world coordinates on or over the display apparatus 150 can be determined, and images can be displayed on the display apparatus 150 based on the determined world coordinates when the user performs position designation by using the contact method and the non-contact method. Further, as to the above described configurations, the contact method and the non-contact method can be selected manually and then performed. As above described, world coordinates can be calculated by selectively using the transformation matrix "H" and the transformation matrix "P" depending on the handwriting operation performed by users such as the contact operation and the non-contact operation.

The above mentioned transformation matrixes can be pre-calculated by a calibration process performed at an initial stage and stored in a memory. In this configuration, after analyzing a handwriting operation (drawing action) performed by a user, world coordinates can be calculated by using the transformation matrix "H" or the transformation matrix "P." If norm $D = \{(\Delta X world)^2 + (\Delta Y world)\}^{1/2}$ between the world coordinates "WH" generated by using the transformation matrix "H" and the world coordinates "WP" generated by using the transformation matrix "P" is a threshold "ε" or less, it is determined that the contact method is employed for designating the position, and the world coordinates "WH" is output by assuming that the contact method is used by the user.

By contrast, if the norm D is greater than the threshold "ε," the world coordinates "WP" is output by assuming that the non-contact position designation method is used by the user. Further, other configurations can be employed. For example, a plurality of image capture devices 301 such as two image capture devices can be disposed, in which one image capture device can be used specifically for the contact position designation method, and another one image capture device can be used specifically for the non-contact position designation method. Further, the contact position designation method or the non-contact position designation method can be set and performed based on specific purposes.

(Determination of Transformation Matrix for Minimizing Visual Perception Error of World Coordinates)

As to the one or more example embodiments, the world coordinates can be calculated by using at least one image capture device such as a camera. Further, the world coordinates can be calculated with enhanced precision by using a plurality of image capture devices, in which the triangulation method of camera can be used for determining the world coordinates. When the plurality of image capture devices is used, it is required to determine a transformation matrix efficiently to minimize the error of world coordinates.

A description is given of a calibration method simultaneously using a plurality of the image capture devices.

Figure 11:
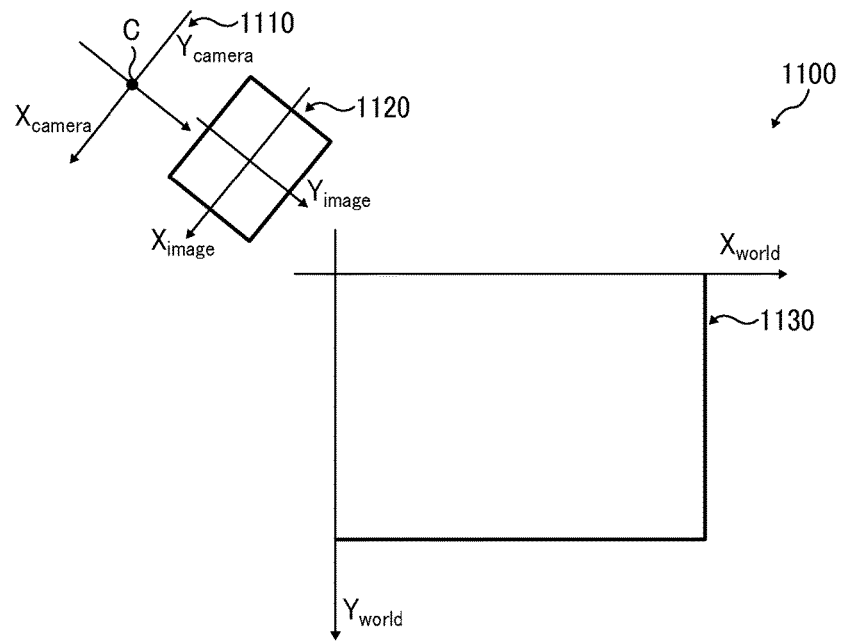
FIG. 11 is a description of references used for an information processing system of one or more example embodiments of the present invention.

A description is given of reference terms used for this simultaneous calibration method as below with reference to FIG. 11, in which (Ximage, Yimage), (Xcamera, Ycamera, Zcamera), (Xworld, Yworld, Zworld), and an external variable are defined as below.

1) (Ximage, Yimage) represents coordinates of a virtual image, and represents a virtual image plane of each of cameras. When an object existing in a space is captured, an image of the object is formed on this virtual image plane.

2) (Xcamera, Ycamera, Zcamera) represents coordinates of a camera, and has the optical center C as the origin, in which Xcamera axis is parallel to Ximage axis of virtual image coordinates, and Ycamera axis is parallel to Yimage axis of virtual image coordinates. The Xcamera axis and Ycamera axis are internal coordinate axes of the optical system of the camera in the three-dimensional space. The (Xcamera, Ycamera, Zcamera) can be set differently for each of the cameras.

3) (Xworld, Yworld, Zworld) represents world coordinates, in which the upper left corner of the display face is defined as the origin, the horizontal or lateral direction of the display face is defined as Xworld axis, and the vertical direction of the display face is defined as Yworld axis, and the world coordinates on the display face becomes (Xworld, Yworld, 0) because "Zworld" on the display face is "0." The axes of world coordinates define an actual space existing in the three-dimensional space independently from the cameras.

4) external variable represents a parameter matrix expressing a relationship of world coordinates and virtual image coordinates such as coordinates of camera. The coordinate transformation between the world coordinates and virtual image coordinates can be performed by using the external variable. The external variable corresponds to a coordinate transformation matrix such as the transformation matrix "H" determined by the calibration process.

Figure 12:
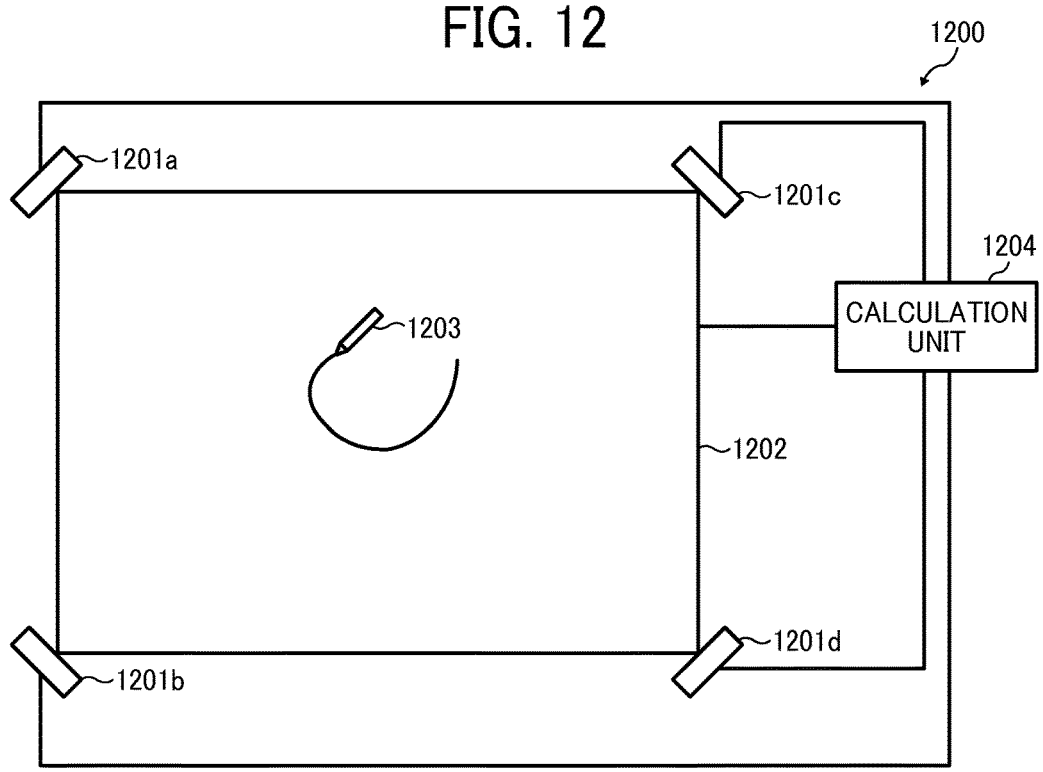
FIG. 12 is a schematic configuration of an information processing system enabling a coordinate input method with enhanced precision.
Figure 13:
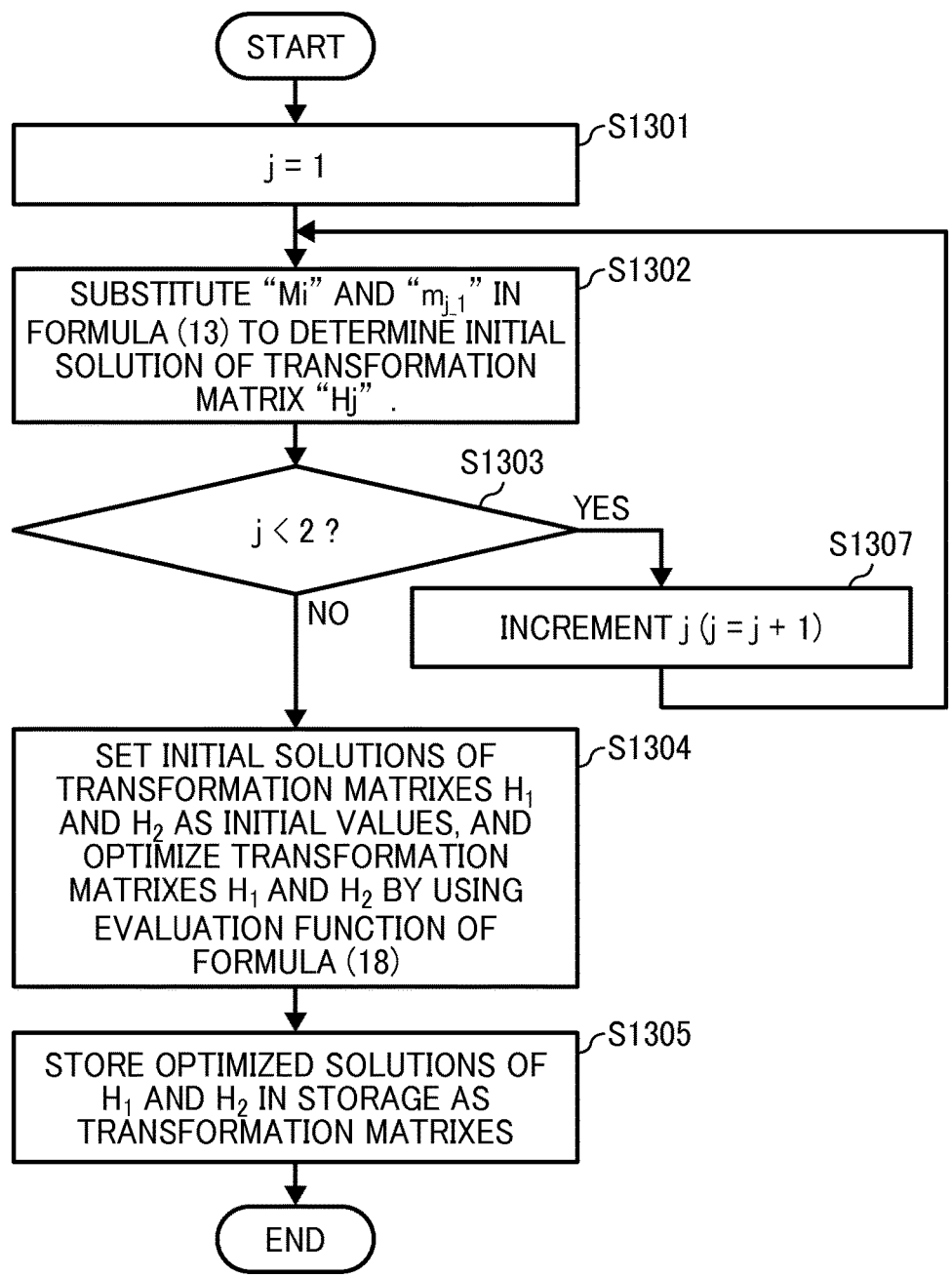
FIG. 13 is a flow chart showing the steps of determining transformation matrixes "$H_1$" and "$H_2$" by a maximum likelihood estimation using an evaluation function.

A description is given of an information processing system 1200 enabling a coordinate input method of a first configuration with reference to FIGS. 12 and 13. The first configuration performs an optimization of transformation matrix to reduce the error on the world coordinates based on an evaluation function to be described below. FIG. 12 is a schematic configuration of the information processing system 1200. The information processing system 1200 includes, for example, a display panel 1202, a plurality of image capture devices 1201 including 1201a, 1201b, 1201c and 1201d, and a calculation unit 1204. The display panel 1202 of the display apparatus 150 employs, for example, a liquid crystal display (LCD), a touch panel or the like. The image capture devices 1201a, 1201b, 1201c, and 1201d are disposed at different positions of the display panel 1202 such as four corners of the display panel 1202 as illustrated in FIG. 12. The calculation unit 1204 includes, for example, a CPU and a memory. The image capture device 1201 captures a specific portion of a pointing device 1203 held by a user such as a front end of the pointing device 1203 as a virtual image.

The virtual image captured by the image capture device 1201 is transmitted to the calculation unit 1204. The calculation unit 1204 determines the world coordinates at the position pointed by the pointing device 1203 by using the transformation matrix "H." The determined world coordinates are converted to given data such as video data, and transmitted to the display panel 120, and the display apparatus 150 instructs the display panel 1202 to display the video data on the display panel 1202.

As to the example configuration of FIG. 12, at least two or more image capture devices 1201 are used, with which the world coordinates (Xworld, Yworld, Zworld) can be determined using the triangulation method of cameras. Further, as to the information processing system 1200, each of the image capture devices 1201 can be independently used for determining the world coordinates, and world coordinates independently determined by each of image capture devices 1201 can be averaged to determine the world coordinates with enhanced precision.

As to the information processing system 1200 of the first configuration, the formula (3) is changed to the below formula (13).

$$\begin{bmatrix} x_{image} \cdot H_{31} - H_{11} & x_{image} \cdot H_{32} - H_{12} \\ y_{image} \cdot H_{31} - H_{21} & y_{image} \cdot H_{32} - H_{22} \end{bmatrix} \quad (13)$$

$$\begin{bmatrix} X_{world} \\ Y_{world} \end{bmatrix} = \begin{bmatrix} H_{13} - x_{image} \cdot H_{33} \\ H_{23} - y_{image} \cdot H_{33} \end{bmatrix}$$

When an inverse matrix is multiplied to the left side of the formula (13) and then changed, the below formula (14) is obtained.

$$\begin{bmatrix} X_{world} \\ Y_{world} \end{bmatrix} = \quad (14)$$

$$\begin{bmatrix} x_{image} \cdot H_{31} - H_{11} & x_{image} \cdot H_{32} - H_{12} \\ y_{image} \cdot H_{31} - H_{21} & y_{image} \cdot H_{32} - H_{22} \end{bmatrix}^{-1} \cdot \begin{bmatrix} H_{13} - x_{image} \cdot H_{33} \\ H_{23} - y_{image} \cdot H_{33} \end{bmatrix}$$

As indicated by the formula (14), when one transformation matrix "H" and coordinates of one virtual image are determined, the corresponding world coordinates (Xworld, Yworld, 0) can be determined. The calibration of the image capture device is performed to determine an optimal rotation angle between the coordinates of camera and world coordinates. Theoretically, the world coordinates can be calculated by using one image capture device. The image capture device is preferably disposed at a position close to the display face as much as possible to reduce a length in the height direction of the display apparatus 150.

In this configuration that the image capture device is disposed at the position close to the display face, a light path extending from the center of the camera and the world coordinates of the object is close and almost parallel to the display face, and thereby the world coordinates along the light direction may be affected by the error of coordinates in the virtual image. Therefore, as to the first configuration, at least two image capture devices are disposed to capture the virtual images, and the virtual images captured along the two light axes of the two image capture devices are used to calculate the world coordinates.

To calculate the world coordinates, the below formulas (15) and (16) are obtained from the formula (13).

$$(x_{imagej} \cdot H_{31} - H_{11}) X_{world} + (x_{imagej} \cdot H_{32} - H_{12}) Y_{world} = (H_{13} - x_{imagej} \cdot H_{33}) \quad (15)$$

$$(y_{imagej} \cdot H_{31} - H_{21}) X_{world} + (y_{imagej} \cdot H_{32} - H_{22}) Y_{world} = (H_{23} - y_{imagej} \cdot H_{33}) \quad (16)$$

The formula (15) indicates an optical configuration that a plane including the center "C" of the camera and Ximage=Ximagej becomes a straight line crossing a plane having Zworld=0. The formula (16) indicates an optical configuration that a plane including the center "C" of the camera and Yimage=Yimagej on a virtual image becomes a straight line crossing the plane having "Zworld=0." To reduce the effect of disposing the image capture devices substantially parallel to the display face, in the first configuration, the two image capture devices 1201 is used and the formula (13) is solved to calculate the world coordinates instead of using the formula (14).

In this description, the first image capture device is used to determine the virtual image coordinates "$m_{1\_j}$", the second image capture device is used to determine the virtual image coordinates "$m_{2\_j}$", the first image capture device is set with a transformation matrix "$H_1$," and the second image capture device is set with a transformation matrix "$H_2$." Each of the world coordinates determined by ""$m_{1\_j}$", "$m_{2\_j}$", "$H_1$", and "$H_2$" can be expressed by the below formula (17).

$$\tilde{M}_i(H_1, H_2, m_{1\_j}, m_{2\_j}) = (\tilde{X}_{worldi}(H_1, H_2, m_{1\_j}, m_{2\_j}), \tilde{Y}_{worldi}(H_1, H_2, m_{1\_j}, m_{2\_j}))^T \quad (17)$$

In this configuration, an evaluation function for evaluating a level of visual perception by a user is defined as expressed by the below formula (18). Specifically, the world coordinates "Mi" of a calibration point is determined by the two image capture devices using the formula (13), and the transformation matrix "H" set for each of the two image capture devices is used calculate the world coordinates of the calibration point by using the formula (17), and the calculated world coordinates is compared with the world coordinates "Mi" determined by using the formula (13), in which the total sum of squares of norm of the world coordinates "Mi" and the calculated world coordinates is defined as the evaluation function.

$$\min_{H_1, H_2} \Sigma_i \| M_i - \tilde{M}_i(H_1, H_2, m_{1\_j}, m_{2\_j}) \|^2 \quad (18)$$

As to the first configuration, the world coordinates "Mi" of the calibration point is obtained by using the formula (13), and the world coordinates of the calibration point is calculated by using the transformation matrixes "$H_1$" and "$H_2$" initially set for each of the image capture devices, and the maximum likelihood estimation is applied to determine optimal transformation matrixes for the transformation matrixes "$H_1$" and "$H_2$" to minimize the total sum of squares of norm of the world coordinates "Mi" and the calculated world coordinates, with which the error of world coordinates can be decreased, or prevented. The total sum of squares of norm of the world coordinates can be generated by the CPU 200 used as a generator of the total sum of squares of norm.

FIG. 13 is a flow chart showing the steps of determining transformation matrixes "$H_1$" and "$H_2$" by a maximum likelihood estimation using the evaluation function.

At step S1301, j=1 is set, in which "j" represents the number of image capture devices, which can be changed depending on the number of image capture devices employed for the system.

At step S1302, "Mi" and "$m_{j\_1}$" are substituted in the formula (13) to determine an initial solution of the transformation matrix "Hj."

At step S1303, it is determined whether "j<2" is satisfied. If it is determined that "j<2" is satisfied (S1303: YES), at step S1307, "j" is incremented as "j=j+1", and then the sequence returns to step S1302 and the process is performed at S1302, with which initial solutions of all of the transformation matrixes "Hj" are determined because this example case of FIG. 13 is performed based on an assumption that the number of image capture devices is two.

If it is determined that "j<2" is not satisfied (S1303: NO), the sequence proceeds to step S1304 because the initial solutions of the transformation matrix "Hj" is already determined for each one of the two image capture devices.

At step S1304, the initial solutions of the transformation matrixes $H_1$ and $H_2$ are used as initial values, and these initial values are substituted in the evaluation function (18), and the initial values are optimized by applying the nonlinear least squares solution such as Levenberg-Marquardt method. After the optimization process, at step S1305, each of optimized solutions of the transformation matrixes $H_1$ and $H_2$ are stored in a storage as an optimized transformation matrix with a given format, and then the sequence ends.

As to the above described method of determining the matrixes used for calibration, transformation matrixes to minimize the deviation between the world coordinates of the pointing device and the world coordinates recognized or perceived by a user can be determined, with which the position in the space can be determined with enhanced precision. The above described method of determining the matrixes used for calibration can be performed by the transformation matrix calculator 307 in the functional block diagram 300 shown in FIG. 3.

(Second Configuration)

The maximum likelihood estimation processing is performed to minimize the error of world coordinates so that display coordinates that a user does not feel oddness can be provided, with which satisfaction level of users can be increased. For example, if the error on the world coordinates (i.e., positional deviation of pen end and the drawing position) is greater, users feel oddness when performing a writing or drawing operation. Therefore, the greater the error on the world coordinates, the greater the dissatisfaction level by users. The minimizing of errors on the virtual image coordinates indirectly relates to decreasing the error on the world coordinates, with which the satisfaction level of the user can be increased. Therefore, by performing the maximum likelihood estimation using indicators directly effecting the satisfaction level of users, the satisfaction level of users can be enhanced.

Figure 14:
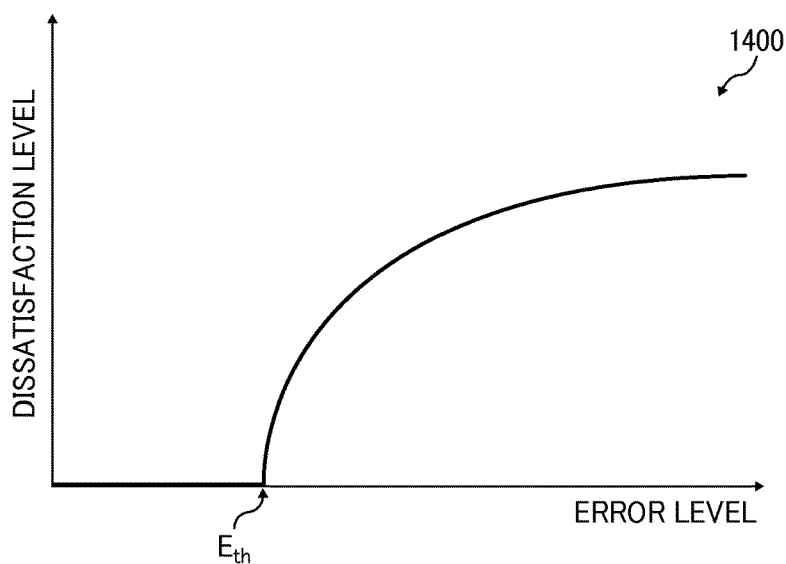
FIG. 14 is an example of a function of error applying a weight factor "w" and dissatisfaction level of users.

As to the first configuration, the error on the world coordinates is defined by the evaluation function, and the evaluation function is optimized. As to the first configuration, it is assumed that the dissatisfaction level of users will increase proportionally to the levels of error occurring on the world coordinates (i.e., linear relationship). However, the perception of users to the error may not be the linear relationship. For example, as indicated by FIG. 14, users do not feel dissatisfaction until a given level of error, but the dissatisfaction starts to increase when the error exceeds a given perception threshold "Eth."

In view of such perception of dissatisfaction, an indicator used for the evaluation function set for the calibration processing can be prepared by adding a weigh factor to the error on the world coordinates so that the indicator can be linked to the satisfaction level of users. Specifically, an initial solution of the transformation matrix "H" is obtained by performing the linear least squares method using the formula (13) similar to the first configuration. Then, when the maximum likelihood estimation is performed for the transformation matrix "H", the weighting is performed to the error on the world coordinates to set the evaluation function, which links the error and the satisfaction level of users, with which the initial solution of the transformation matrix "H" is optimized. A description is given of processing of the second configuration.

As to the second configuration, the world coordinates calculated by the linear least squares method is obtained by the formula (17). Further, the error on the world coordinates is expressed by the below formula (19), in which a distance (i.e., norm) between the world coordinates calculated from the both transformation matrixes $H_1$ and $H_2$ obtained by the linear least squares method, and the actual world coordinates "Mi" determined in advance is calculated.

$$\text{error}(H_1,H_2,m_{1\_j},m_{2\_j}) = \|M_i - \tilde{M}_i(H_1,H_2,m_{1\_j},m_{2\_j})\| \quad (19)$$

Then, the weight factor is applied in line with the dissatisfaction level of users, in which, as illustrated in FIG. 14. For, example, a weight factor "w" is applied to the error based on experiments. The evaluation function can be defined by the below formula (20) based on the error applied with the weight factor "w."

$$\min_{H_1,H_2} \Sigma_i (w(\text{error}(H_1,H_2,m_{1\_j},m_{2\_j})) \times \text{error}(H_1,H_2,m_{1\_j},m_{2\_j}))^2 \quad (20)$$

Compared to the evaluation function of the first configuration, as indicated by the formula (20), the weight factor "w" for error is multiplied to squares of errors on the world coordinates to generate the weight-applied total sum of squares of norm. When the formula (20) is used, the maximum likelihood estimation can be performed based on an area having greater error instead of an area having smaller error, with which the satisfaction level of users can be further enhanced.

Figure 15:
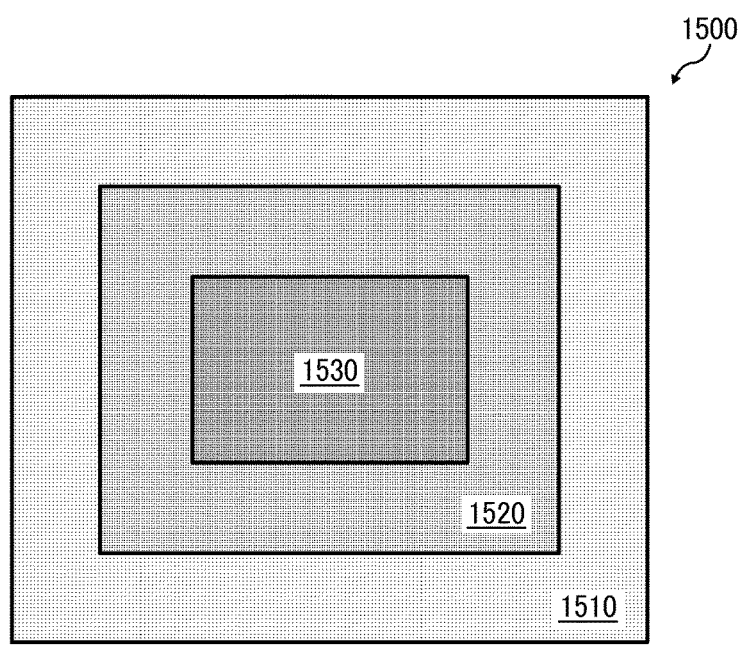
FIG. 15 is an example of a weight factor "p" set for an evaluation function of world coordinates.

Further, a variant example of the second configuration can be devised as shown in FIG. 15, in which a weight factor "p (world)" is defined as a function of world coordinates. As to a scheme 1500 shown in FIG. 15, the weight factor "p (world)" is defined as a step function that changes the weight factor in view the distance from the center of the display face, in which the weight factor "p (world)" is set with the highest level at the center 1530, and then the weight factor "p (world)" is decreased gradually as closer to a first periphery 1520, and a second periphery 1510 of the display device such as a display panel.

The evaluation function applied with the weight factor "p (world)" shown in FIG. 15 can be expressed by the below formula (21).

$$\min_{H_1,H_2} \Sigma_i (p(\tilde{M}_i(H_1,H_2,m_{1\_j},m_{2\_j})) \times \text{error}(H_1,H_2,m_{1\_j},m_{2\_j}))^2 \quad (21)$$

Figure 16:
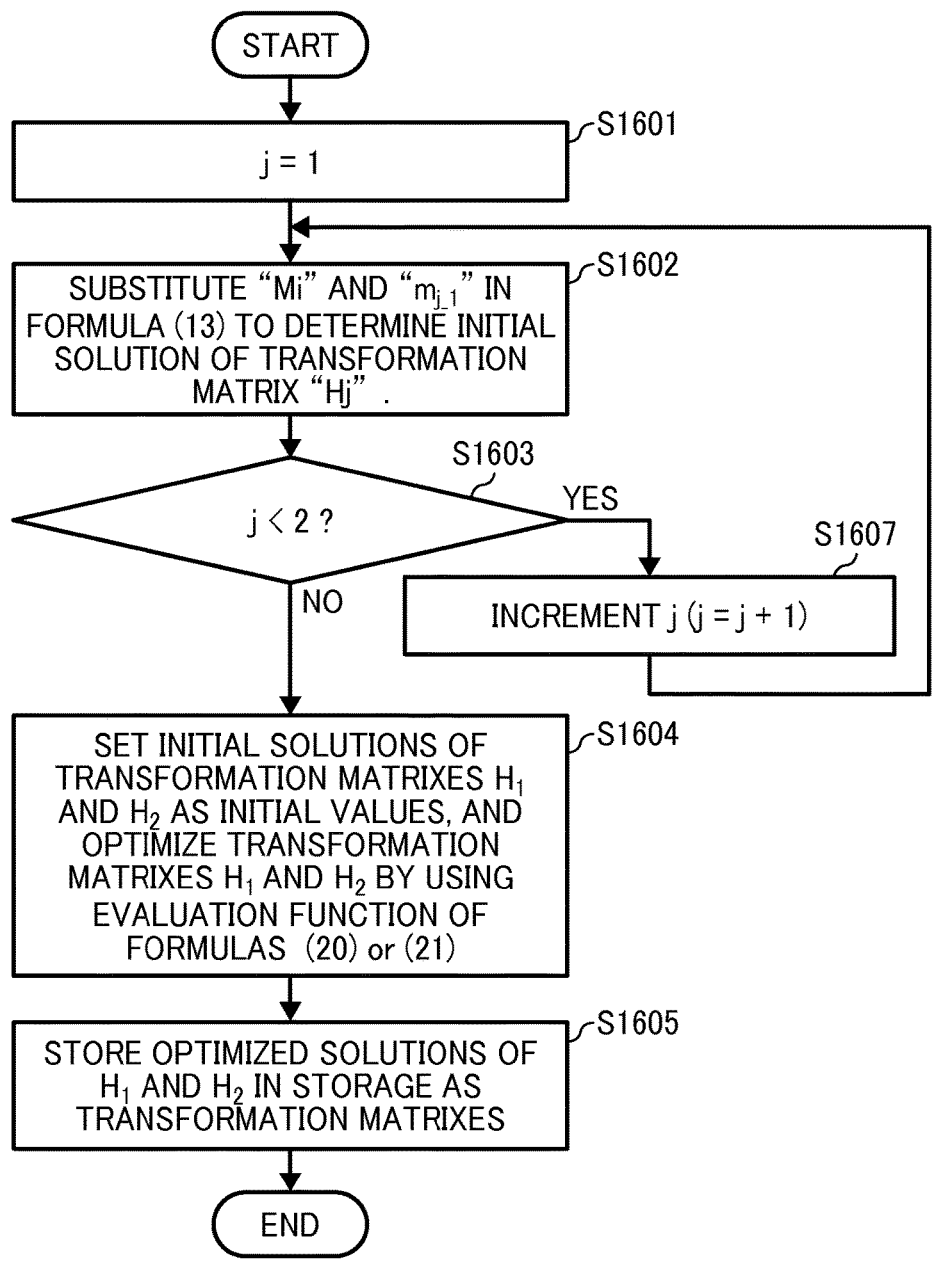
FIG. 16 is a flow chart showing the steps of determining transformation matrixes "$H_1$" and "$H_2$" by a maximum likelihood estimation using an evaluation function applying a weight factor to the total sum of squares of norm.

As to the variant example, an area used with higher frequency by a user operation such as a drawing action can be processed by the maximum likelihood estimation with higher priority, with which the error occurred to the drawing action by the user can be reduced. The weight factor can be applied to the total sum of squares of norm of the world coordinates by the CPU 200 used as the generator of the total sum of squares of norm FIG. 16 is a flow chart showing the steps of determining transformation matrixes "$H_1$" and "$H_2$" by a maximum likelihood estimation using the evaluation function applying the weight factor to the total sum of squares of norm of the second configuration.

At step S1601, j=1 is set, in which "j" represents the number of image capture devices, which can be changed depending on the number of image capture devices employed for the system.

At S1602, "Mi" and "$m_{j\_1}$" are substituted in the formula (13) to determine an initial solution of the transformation matrix "$H_j$".

At step S1603, it is determined whether "j<2" is satisfied. If it is determined that "j<2" is satisfied (S1603: YES), at step S1607, "j" is incremented as "j=j+1," and then the sequence returns to step S1602 and the process is performed at S1602, with which initial solutions of all of the transformation matrixes "Hj" are determined because this example case of FIG. 16 is performed based on an assumption that the number of image capture devices is two.

If it is determined that "j<2" is not satisfied (S1603: NO), the sequence proceeds to step S1604 because the initial solution of the transformation matrix "Hj" is already determined for each one of the two image capture devices.

At step S1604, the initial solutions of the transformation matrixes $H_1$ and $H_2$ are used as initial values, and these initial values are substituted in the evaluation function formulas (20) or (21), and the initial values are optimized by applying the nonlinear least squares solution such as Levenberg-Marquardt method. After the optimization process, at step S1605, each of the optimized solutions of the transformation matrixes $H_1$ and $H_2$ are stored in a storage as optimized transformation matrixes with a given format, and then the sequence ends.

The above described information processing system, information processing apparatus, method of transforming coordinates, and storage medium of one or more example embodiments can transform coordinates of designated positions in a virtual image to world coordinates in the two or three-dimensional space (i.e., coordinates in a physical world) when the pointer is operated relative to a plane disposed in the two or three-dimensional space with or without touching the plane.

The present invention can be implemented in any convenient form, for example using dedicated hardware platform, or a mixture of dedicated hardware platform and software. Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions. For example, in some embodiments, any one of the information processing apparatus may include a plurality of computing devices, e.g., a server cluster, that are configured to communicate with each other over any type of communication links, including a network, a shared memory, etc. to collectively perform the processes disclosed herein.

The computer software can be provided to the programmable device using any carrier medium or storage medium such as non-volatile memory for storing processor-readable code such as a floppy disk, a flexible disk, a compact disk read only memory (CD-ROM), a compact disk rewritable (CD-RW), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a flash memory, Blu-ray disc (registered trademark), secure digital (SD) card, a solid state memory device or the like, but not limited these. Further, the computer software can be provided through communication lines such as electrical communication line. Further, the computer software can be provided in a read only memory (ROM) disposed for the computer. The computer software stored in the storage medium can be installed to the computer and executed to implement the above described processing. The computer software stored in the storage medium of an external apparatus can be downloaded and installed to the computer via a network to implement the above described processing.

The hardware platform includes any desired kind of hardware resources including, for example, a central processing unit (CPU), a random access memory (RAM), and a hard disk drive (HDD). The CPU may be implemented by any desired kind of any desired number of processors. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

In the above-described example embodiment, a computer can be used with a computer-readable program, described by object-oriented programming languages such as C, C++, C#, Java (registered trademark), JavaScript (registered trademark), Perl, Ruby, or legacy programming languages such as machine language, assembler language to control functional units used for the apparatus or system. For example, a particular computer (e.g., personal computer, workstation) may control an information processing apparatus or an image processing apparatus such as image forming apparatus using a computer-readable program, which can execute the above-described processes or steps. In the above-described embodiments, at least one or more of the units of apparatus can be implemented as hardware or as a combination of hardware/software combination. Each of the functions of the described embodiments may be implemented by one or more processing circuits. A processing circuit includes a programmed processor, as a processor includes circuitry. A processing circuit also includes devices such as an application specific integrated circuit (ASIC) and conventional circuit components arranged to perform the recited functions.

Numerous additional modifications and variations for the communication terminal, information processing system, and information processing method, a program to execute the information processing method by a computer, and a storage or carrier medium of the program are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An information processing system comprising:
    a pointer to designate a position in a three-dimensional space relative to a display;
    a first image capture device to capture the position designated by the pointer relative to the display as a virtual image of the pointer;
    a parameter calculator to calculate at least one of
        a first parameter for transforming coordinates of the position designated by the pointer in the virtual image to world coordinates upon the pointer being operated on the display by touching the display, and
        a second parameter for transforming coordinates of the position designated by the pointer in the virtual image upon the pointer being operated above the display without touching the display;
    a world coordinate calculator to transform the coordinates of the position designated by the pointer in the virtual image to the world coordinates by applying the at least one of the first parameter and the second parameter calculated by the parameter calculator; and
    a second image capture device, the second image capture device having a same configuration as the first image capture device,
    wherein the world coordinate calculator is further configured to calculate world coordinates of a calibration point in the virtual image, upon capture by the first image capture device and the second image capture device, by applying a parameter set for the first image capture device and a parameter set for the second image capture device, and
    wherein the parameter calculator is further configured to optimize the parameter set for the first image capture device and the parameter set for the second image capture device with values that minimize a total sum of squares of a norm generated between world coordinates of the calibration point previously determined and the world coordinates of the calibration point calculated.

2. The information processing system of claim 1, wherein upon the virtual image captured by the first image capture device being composed with coordinates of a two-dimensional space defined by two orthogonal axes, the parameter calculator being configured to calculate the first parameter to transform the coordinates of the position designated by the pointer in the virtual image to the world coordinates in the two-dimensional space, and
    upon the virtual image captured by the first image capture device being composed with coordinates of a three-dimensional space defined by three orthogonal axes, the parameter calculator being configured to calculate the second parameter to transform the coordinates of the position designated by the pointer in the virtual image to the world coordinates in the three-dimensional space based on the first parameter.

3. The information processing system of claim 1, further comprising a generator to generate the total sum of squares of the norm, including application of a weight factor.

4. The information processing system of claim 1, wherein the coordinates of a position of the point of interest in the virtual image correspond to coordinates of a position designated by a pointer in the virtual image.

5. The information processing system of claim 1, wherein the parameter calculator is further configured to calculate the first parameter, for transforming the coordinates of the position of the point of interest in the virtual image to world coordinates in two-dimensional space, upon pointer being operated on the display by touching the display, and to calculate the second parameter, for transforming the coordinates of the position of the point of interest in the virtual image to world coordinates in three-dimensional space, upon the pointer being operated above the display without touching the display.

6. The information processing system of claim 5, wherein the world coordinate calculator is further configured to transform the coordinates of the position of the point of interest in the virtual image to at least one of world coordinates in the two-dimensional space by applying the first parameter and world coordinates in the three-dimensional space by applying the second parameter.

7. An information processing apparatus for transforming coordinates of a point of interest in a virtual image captured by a first image capture device to world coordinates in at least one of a two-dimensional space and a three-dimensional space, the information processing apparatus comprising;
an image processor to identify the coordinates of the point of interest in the virtual image as virtual image coordinates;
a parameter calculator to calculate at least one of
a first parameter for transforming the coordinates of a position of the point of interest in the virtual image to world coordinates in the two-dimensional space upon a pointer being operated on a display by touching the display, and
a second parameter for transforming the coordinates of the position of the point of interest in the virtual image to world coordinates in the three-dimensional space upon the pointer being operated above the display without touching the display;
a world coordinate calculator to transform the coordinates of the position of the point of interest in the virtual image to at least one of
world coordinates in the two-dimensional space by applying the first parameter, and
world coordinates in the three-dimensional space by applying the second parameter;
a display data generator to generate display data based on at least one of the world coordinates in the two-dimensional space and the world coordinates in the three-dimensional space;
a display controller to display the generated display data on the display; and
a second image capture device, the second image capture device having a same configuration as the first image capture device,
wherein the world coordinate calculator is further configured to calculate world coordinates of a calibration point in the virtual image, upon capture by the first image capture device and the second image capture device, by applying a parameter set for the first image capture device and a parameter set for the second image capture device, and
wherein the parameter calculator is further configured to optimize the parameter set for the first image capture device and the parameter set for the second image capture device with values that minimize a total sum of squares of a norm generated between world coordinates of the calibration point previously determined and the world coordinates of the calibration point calculated.

8. The information processing apparatus of claim 7, wherein
upon the virtual image captured by the first image capture device being composed with coordinates of the two-dimensional space defined by two orthogonal axes, the parameter calculator being configured to calculate the first parameter to transform the coordinates of a position designated by the pointer in the virtual image to the world coordinates in the two-dimensional space, and
upon the virtual image captured by the first image capture device being composed with coordinates of the three-dimensional space defined by three orthogonal axes, the parameter calculator being configured to calculate the second parameter to transform the coordinates of the position designated by the pointer in the virtual image to the world coordinates in the three-dimensional space based on the first parameter.

9. The information processing apparatus of claim 7, further comprising a generator to generate the total sum of squares of the norm, including application of a weight factor.

10. A method of transforming coordinates of a point of interest in a virtual image captured by a first image capture device to world coordinates in at least one of a two-dimensional space and a three-dimensional space, the method comprising:
identifying coordinates of the point of interest in the virtual image captured by the first image capture device as virtual image coordinates;
calculating at least one of
a first parameter for transforming the coordinates of the point of interest in the virtual image to world coordinates in the two-dimensional space upon the point of interest existing on a display, and
a second parameter for transforming the coordinates of the point of interest in the virtual image to world coordinates in the three-dimensional space upon the point of interest existing above the display;
transforming the coordinates of the point of interest in the virtual image to at least one of the world coordinates in the two-dimensional space by applying the first parameter and the world coordinates in the three-dimensional space by applying the second parameter;
generating display data from at least one of the world coordinates in the two-dimensional space and the world coordinates in the three-dimensional space;
displaying the generated display data on the display;
calculating world coordinates of a calibration point in the virtual image upon capture by the first image capture device and a second image capture device, having a same configuration as the first image capture device, by applying a parameter set for the first image capture device, and a parameter set for the second image capture device;
computing a total sum of squares of a norm between world coordinates of the calibration point previously determined and the world coordinates of the calibration point calculated; and
optimizing the parameter set for the first image capture device and the parameter set for the second image capture device with values that minimize the total sum of squares of the norm between the world coordinates of the calibration point previously determined and world coordinates of the calibration point calculated.

11. The method of claim 10, wherein upon the virtual image captured by the first image capture device being composed with coordinates of the two-dimensional space defined by two orthogonal axes, the calculating includes calculating the first parameter to transform the coordinates of the point of interest in the virtual image to the world coordinates in the two-dimensional space, and upon the virtual image captured by the first image capture device being composed with coordinates of the three-dimensional space defined by three orthogonal axes, the calculating includes calculating the second parameter to transform the coordinates of the point of interest in the virtual image to the world coordinates in the three-dimensional space based on the first parameter.

12. The method of claim 11, wherein the point of interest in the virtual image corresponds to a position designated by a pointer.

13. The method of claim 10, wherein the computing of the total sum of squares of the norm includes applying a weight factor.

14. The method of claim 13, wherein the point of interest in the virtual image corresponds to a position designated by a pointer.

15. The method of claim 10, wherein the point of interest in the virtual image corresponds to a position designated by a pointer.

* * * * *